United States Patent [19]

Phillips

[11] Patent Number: 5,642,222
[45] Date of Patent: Jun. 24, 1997

[54] ELASTOMERIC RETROREFLECTIVE STRUCTURE

[75] Inventor: Edward D. Phillips, Oakville, Conn.

[73] Assignee: Reflexite Corporation, Avon, Conn.

[21] Appl. No.: 551,625

[22] Filed: Nov. 1, 1995

Related U.S. Application Data

[62] Division of Ser. No. 495,371, Jun. 28, 1995, Pat. No. 5,491,586, which is a continuation of Ser. No. 93,777, Jul. 19, 1993, abandoned.

[51] Int. Cl.$^6$ ............................................. G02B 5/124
[52] U.S. Cl. ............................................. 359/530; 359/529
[58] Field of Search ...................................... 359/529–530; 264/1.9, 1.1; 156/60, 71, 166, 181, 184; 428/174, 178, 332, 337, 913

[56] References Cited

U.S. PATENT DOCUMENTS

| | | |
|---|---|---|
| 3,684,348 | 8/1972 | Rowland . |
| 3,689,346 | 9/1972 | Rowland ........................ 156/245 |
| 3,712,706 | 1/1973 | Stamm . |
| 3,810,804 | 5/1974 | Rowland ........................ 156/245 |
| 3,811,983 | 5/1974 | Rowland ........................ 156/245 |
| 3,935,359 | 1/1976 | Rowland ........................ 428/172 |
| 3,975,083 | 8/1976 | Rowland . |
| 3,992,080 | 11/1976 | Rowland . |
| 4,244,683 | 1/1981 | Rowland ........................ 425/143 |
| 4,555,161 | 11/1985 | Rowland . |
| 4,576,850 | 3/1986 | Martens ........................ 428/156 |
| 4,648,689 | 3/1987 | May . |
| 4,648,932 | 3/1987 | Bailey ........................... 156/276 |
| 4,664,966 | 5/1987 | Bailey et al. ................. 428/203 |
| 4,668,558 | 5/1987 | Barber .......................... 428/156 |
| 4,703,999 | 11/1987 | Benson . |
| 4,767,659 | 8/1988 | Bailey et al. ................. 428/203 |
| 4,801,193 | 1/1989 | Martin . |
| 4,808,471 | 2/1989 | Grunzinger .................. 428/325 |
| 4,844,976 | 7/1989 | Huang .......................... 428/323 |
| 5,139,590 | 8/1992 | Wyckoff ....................... 156/71 |
| 5,171,624 | 12/1992 | Walter .......................... 428/156 |
| 5,229,882 | 7/1993 | Rowland ....................... 359/530 |
| 5,264,063 | 11/1993 | Martin .......................... 156/247 |
| 5,316,838 | 5/1994 | Crandall et al. .............. 428/283 |

FOREIGN PATENT DOCUMENTS

WO94/19711  9/1994  WIPO .

*Primary Examiner*—James Phan
*Attorney, Agent, or Firm*—Hamilton, Brook, Smith & Reynolds, P.C.

[57] ABSTRACT

A retroreflective structure having prism elements and a method for making the structure are disclosed. The retroreflective structure is formed of an extensible, elastomeric film and a rigid, non-extensible array of retroreflective prism elements. The array is bonded to the elastomeric film, thereby forming a retroreflective structure which can be significantly stretched without significantly diminishing the retroreflective properties of the structure.

18 Claims, 2 Drawing Sheets

ELASTOMERIC RETROREFLECTIVE STRUCTURE

This application is a division of U.S. patent application Ser. No. 08/495,371, filed Jun. 28, 1995 and which issued as U.S. Pat. No. 5,491,586 on Feb. 13, 1996, which is a file wrapper continuation of U.S. patent application Ser. No. 08/093,777, filed Jul. 19, 1993, now abandoned, all of which are incorporated herein by reference in their entirety.

BACKGROUND OF THE INVENTION

Retroreflective materials are employed for various safety and decorative purposes. Particularly, these materials are useful at night time when visibility is important under low light conditions. With perfect retroreflective materials, light rays are reflected essentially towards a light source in a substantially parallel path along an axis of retroreflectivity. For many applications, perfect retroreflectivity is not required. Rather, a compromise is required in which a cone of divergence is provided which permits a degree of divergence which enables enough divergent light to strike the viewer's eye, yet not so much that the intensity of the reflective light at the viewer's eye is unduly diminished. Under circumstances where the only source of illumination is the headlights of an automobile on an unlit road, the ability to retroreflect a cone of divergence to the eye of the driver is important for safety reasons.

Many types of retroreflective material exist for various purposes. These retroreflective materials can be used as reflective tapes and patches for clothing, such as vests and belts. Also, retroreflective bands can be used on posts, barrels, traffic cone collars, highway signs, warning reflectors, etc. Retroreflective material may be comprised of arrays of randomly oriented micron diameter spheres or close packed cube-corner (prismatic) arrays.

Cube-corner or prismatic retroreflectors are described in U.S. Pat. No. 3,712,706, issued to Stamm (Jan. 23, 1973). Generally, the prisms are made by forming a master negative die on a flat surface of a metal plate or other suitable material. To form the cube-corners, three series of parallel equidistance intersecting V-shaped grooves 60 degrees apart are inscribed in the flat plate. The die is then used to process the desired cube-corner array into a rigid flat plastic surface.

When the groove angle is 70 degrees, 31 minutes, 43.6 seconds, the angle formed by the intersection of two cube faces (the dihedral angle) is 90 degrees and the incident light is reflected back to the source. For automobile headlight reflectors, the dihedral angle is changed so that the incidental light is reflected non-orthogonally towards the driver instead of the source.

The efficiency of a retroreflective structure is a measure of the amount of incidental light returned within a cone diverging from the axis of retroreflection. Distortion of the prismatic structure adversely effects the efficiency. Furthermore, cube-corner retroreflective elements have low angularity, i.e., the element will only brightly retroreflect light that impinges on it within a narrow angular range centering approximately on its optical axis. Low angularity arises by the inherent nature of these elements, which are trihedral structures having three mutually perpendicular lateral faces. The elements are arranged so that light to be retroreflected impinges into the internal space defined by the faces, and retroreflection of the impinging light occurs by internal reflection of the light from face to face of the element. Impinging light that is inclined substantially away from the optical axis of the element (which is the trisector of the internal space defined by the faces of the element) strikes a face at an angle less than its critical angle, thereby passing through the face rather than being reflected.

Further details concerning the structures and operation of cube-corner microprisms can be found in U.S. Pat. No. 3,684,348, issued to Rowland (Aug. 15, 1972), the teachings of which are incorporated by reference herein. A method for making retroreflective sheeting is also disclosed in U.S. Pat. No. 3,689,346, issued to Rowland (Sep. 5, 1972), the teachings of which are incorporated by reference herein. The disclosed method is for forming cube-corner microprisms in a cooperatively configured mold. The prisms are bonded to sheeting which is applied thereover to provide a composite structure in which the cube-corner formations project from one surface of the sheeting.

SUMMARY OF THE INVENTION

Retroreflective prism arrays are generally formed of rigid and non-extensible materials. Such materials cannot be stretched and therefore are unsuitable for garment tape and conspicuity tape, particularly if the tape has to be applied over irregular surfaces, where stretching is required. Alternatively, the prism arrays are formed of a flexible material. When such prism arrays are stretched to conform to an irregular surface, changes occur in the optical axis or in the dihedral angles of the retroreflective elements. These changes alter the distribution of the return light, thereby rendering the arrays less visible and protective. Therefore, a need exists for retroreflective arrays that can be significantly stretched while not significantly diminishing its retroreflective properties.

The present invention relates to a retroreflective structure formed of rigid prismatic elements bonded to an elastomeric film and a method for forming the structure.

The structure is comprised of an extensible elastomeric film and a rigid, non-extensible array of retroreflective cube-corner prismatic elements. The array is bonded to the elastomeric film, thereby forming a retroreflective structure which can be significantly stretched without significantly diminishing the retroreflective properties of the structure.

A method for forming the retroreflective structure includes the following steps: polymerizing a polymerizable material in a suitable mold to form a rigid, non-extensible array prisms; and applying the array to an elastomeric film to form a retroreflective structure, which can be significantly stretched without significantly diminishing the retroreflective properties of the retroreflective structure.

Another embodiment of the method of the invention, employed for forming a retroreflective structure, includes the following steps: polymerizing a polymerizable material in a suitable mold to form a rigid, non-extensible array of retroreflective prisms having a window side and facet side; applying a release film to the window side of the rigid non-extensible prism array; applying the prismatic surfaces with an optically reflective material; applying an adhesive backing or an elastomeric film over the coated prism facet sides of the structure; removing the release film; and applying an optically transparent elastomeric coating to the window side of the prism array, thereby forming a retroreflective structure which can be significantly stretched without significantly diminishing the retroreflective properties of the structure.

DETAILED DESCRIPTION OF THE INVENTION

The features and other details of the method and apparatus of the invention will now be more particularly described with reference to the accompanying drawings and pointed out in the claims. The same numeral present in different figures represents the same item. It will be understood that the particular embodiments of the invention are shown by way of illustration and not as limitations of the invention. The principal features of this invention can be employed in various embodiments without departing from the scope of the invention.

Figure 1:
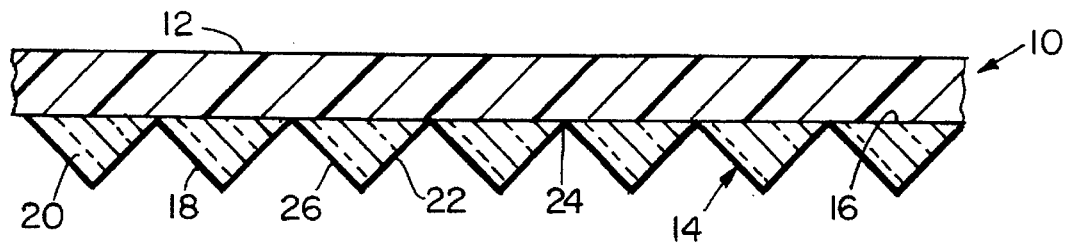
FIG. 1 is a cross-sectional view of a first embodiment of a retroreflective structure of the present invention.

One embodiment of the invention, as shown in FIG. 1 in a cross-sectional view, is retroreflective structure 10. Retroreflective structure 10 is formed of an elastomeric film 12 and non-extensible retroreflective prism array 14.

Elastomeric film 12 comprises an extensible elastomeric polymer. An elastomeric polymer is considered to be a material which can recover substantially its original shape after a deforming force has been removed. Preferably, the elastomeric polymer is transparent to visible light and is composed of a polymer, such as polyurethane, polyisobutylene, polyester, polybutadiene, polyvinyl chloride or polyvinylidene chloride. Alternatively, the elastomeric polymer can be a copolymer or terpolymer, such as poly(ethylene-propylene), poly(styrenebutadiene), poly(vinyl acetate-vinyl chloride) and poly(ethylene-vinyl acetate).

The elastomeric polymer is extensible so that when a tensile force is applied, the polymer stretches and upon relaxation of the tensile force the polymer returns essentially to its original shape.

Elastomeric film 12 may have a thickness in the range of between about 0.5 and 30 mils (0.0005 and 0.03 inches). In a preferred embodiment, the thickness is in the range of between about 1 and 10 mils (0.001 and 0.01 inches). The selected thickness is dependent upon the method of fabrication, the elastomer and the characteristics desired for the retroreflective structure.

The non-extensible array 14 consists of retroreflective cube-corner prism elements. Non-extensible prism array 14 has a window side 16 and facet sides 18. Non-extensible prism array 14 is formed of a transparent polymer that has a high modulus of elasticity. After being formed, the polymer is substantially rigid, which is defined as being substantially inflexible. The polymer is also non-extensible, which is defined as not being capable of being substantially stretched without breaking. The polymer is selected from a wide variety of polymers that are considered rigid. These polymers include the polymers of urethane, acrylic acid esters, cellulose esters, ethylenically unsaturated nitriles, hard epoxy acrylates, etc. Other polymers include polycarbonates, polyesters and polyolefins, acrylated silanes, hard polyester urethane acrylates. Preferably, the polymer can be cast in a prismatic mold with a monomer or oligomer polymerization initiated by ultraviolet radiation.

The rigid prisms 20 of the array are cube-corner in shape and have a length along each cube-side edge 22 in the range of between about 4 and 20 mils (0.004 and 0.02 inches). In one embodiment, each cube-side edge 22 has a length of about 0.006 inches. Preferably, each cube-side edge 22 has a length of between about 0.004 and 0.008 inches.

The thickness of non-extensible prism array 14 at valley 24, where the rigid prisms 20 intersect, is sufficiently thin so that non-extensible prism array 14 can crack and split along valleys 24 when a minimal tensile force is applied to retroreflective structure 10. This allows structure 10 to significantly stretch while allowing rigid prisms 20 to remain in position with respect to elastomeric film 12, where rigid prisms 20 are attached, whereby rigid prisms 20 are not significantly distorted, thereby significantly maintaining the retroreflective properties of structure 10. After the tension is relaxed, retroreflective structure 10 substantially returns to its prestretched size and shape without significantly diminishing the retroreflective properties or aesthetic appearance of the structure. In one embodiment, the thickness of non-extensible prism array 14 is in the range of between about 0.0028 and 0.009 inches.

Elastomeric film 12 provides a transparent substrate to non-extensible prism array 14 of rigid prisms 20 to provide a smooth surface upon which rigid prisms 20 can attach. Non-extensible prism array 14 with rigid prisms 20 may be laminated to elastomeric film 12 with a transparent adhesive. Alternatively, non-extensible prism array 14 can be directly cast onto elastomeric film 12 in one step. If an adhesive is employed on the prism facets, the adhesive can cause the surface of the rigid prisms to wet the surface of the prisms, thereby destroying the air interface and eliminating the ability of the prism to retroreflect. As a result, reflective coating 26 is preferably deposited on the surface of the dihedral facets. Typically, the reflective coatings are formed by sputtering aluminum, silver or gold or by vacuum metallization. Alternatively, metal lacquers, dielectric coatings and other specular coating materials can be employed.

Figure 2A:
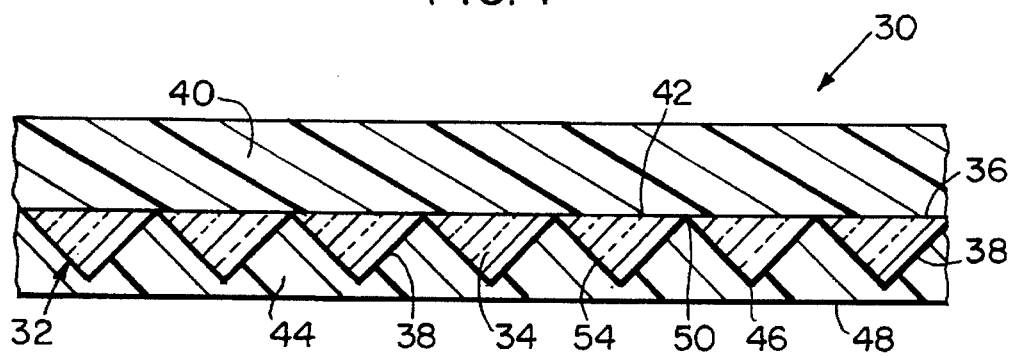
FIGS. 2A–2C are cross-sectional views of a method of forming an alternate retroreflective structure at various points in forming an alternate embodiment of the present invention.
Figure 2B:
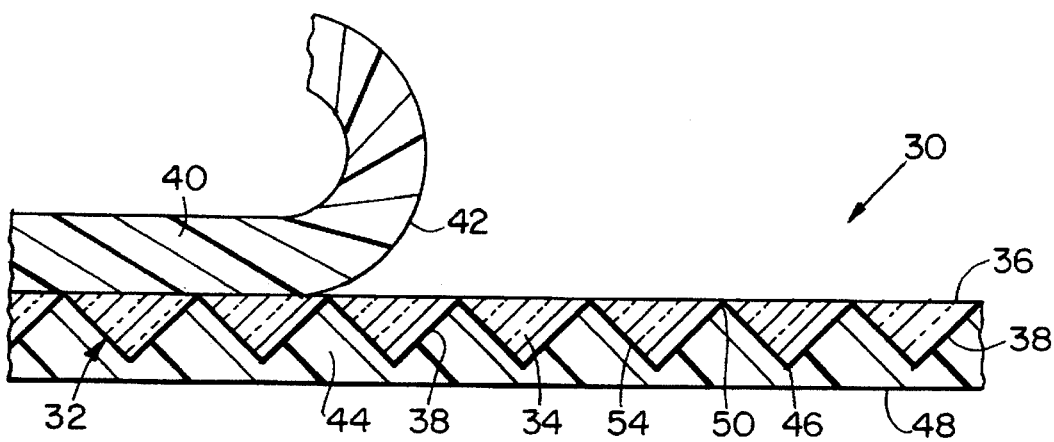
Figure 2C:
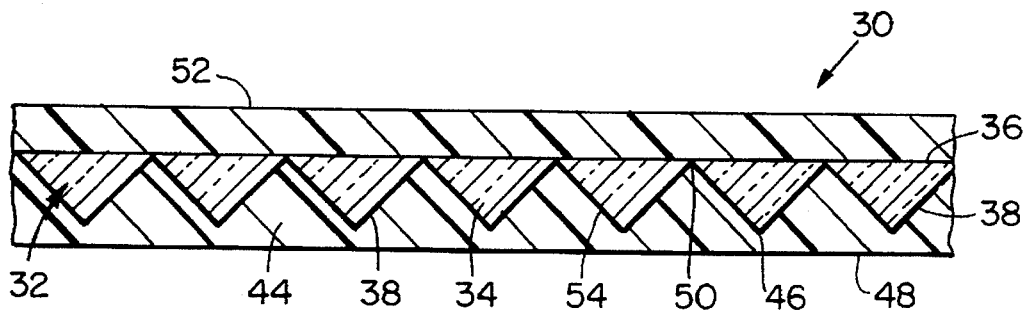

As shown in FIGS. 2A, 2B and 2C, a method of forming an alternative embodiment of retroreflective structure 30 is shown at various points in the process of forming the structure. In FIG. 2A, non-extensible prism array 32 of rigid prisms 34 is formed by casting onto release film 40 at release film surface 42. The array 32 has a window side 36 and facet size 38. Release film 40 is formed of a polymer, such as polyethylene terephthalate (PET), and has a thickness in the range of between about 0.001 and 0.01 inches. The rigid prisms 34 are essentially of the same shape and dimensions as described in FIG. 1. The facet sides 38 of non-extensible prism array 32 are then metallized by a suitable method, such as sputtering, to form an opaque reflective layer 54.

Elastomeric film 44 is applied over opaque reflective layer 54 of non-extensible prism array 32. Elastomeric film 44 is formed by coating with a radiation curable, solvent-borne or water-borne coating, which when cured or dried, forms an elastomeric film. The thickness of elastomeric film 44 between valley 50 to elastomeric surface 48 is in the range of between about 0.004 and 0.2 inches (4 and 200 mils).

As shown in FIG. 2B, the bond between rigid prisms 34 and elastomeric film 44 is sufficiently strong to allow release film 40 to be removed from window side 36 of non-extensible prism array 32 while facet sides 38 of non-extensible prism array 32 remain bonded to opaque reflective layer 54 and elastomeric layer 44. Therefore, release film 40 may be removed from non-extensible array 32 by peeling or other suitable method.

After release film 40 is removed, elastomeric coating 52 is formed on window side 36 of non-extensible prism array 32. Suitable materials for elastomeric coating 52 include elastomeric urethane acrylates, acrylated polybutadienes, solvent-borne or water-borne urethanes, vinyl copolymers and various latexes, such as an acrylic. Elastomeric coating 52 has a thickness in the range of between about 0.0005 and 0.03 inches (0.5 and 30 mils) and a modulus of elasticity similar to that of elastomeric film 44. The coating is formed by either bonding an elastomeric film or polymerizing a prepolymer to form an elastomer.

Figure 3A:
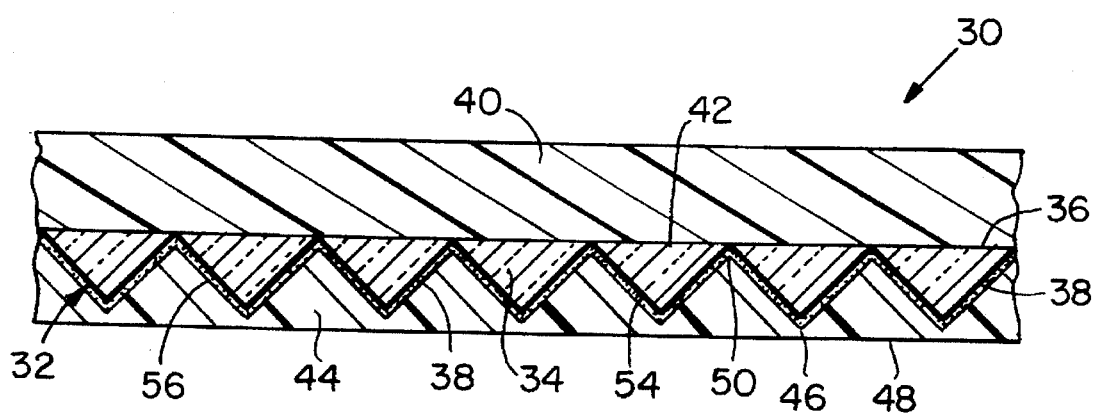
FIGS. 3A–3C are cross-sectional views of a method of forming an another retroreflective structure at various points in forming another embodiment of the present invention.
Figure 3B:
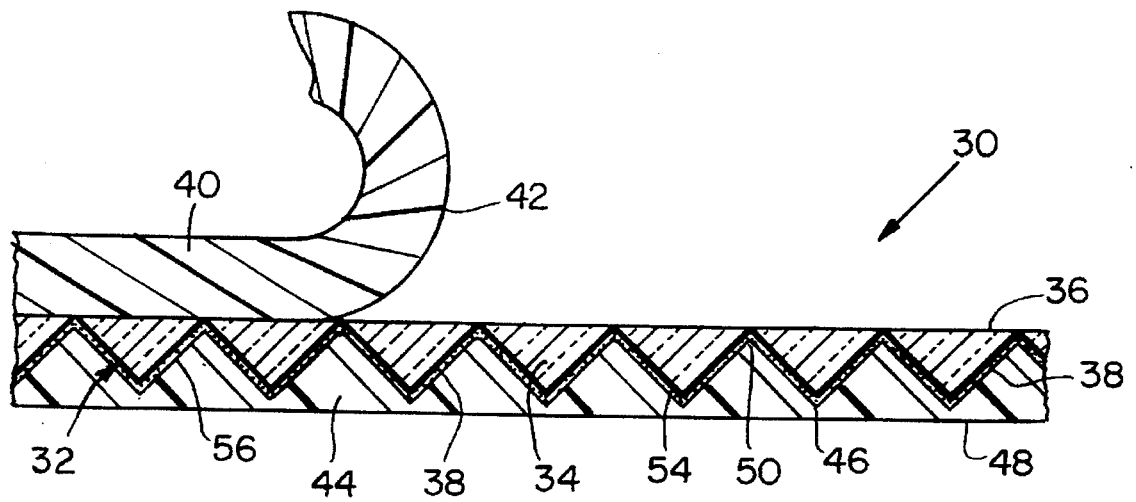
Figure 3C:
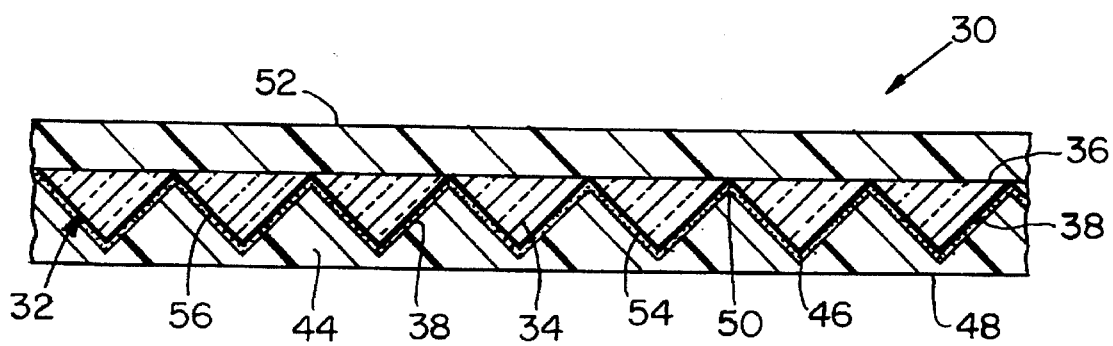

FIGS. 3A, 3B and 3C illustrate another embodiment of the invention. The structure of FIGS. 3A, 3B and 3C has many of the same elements of FIGS. 2A, 2B and 2C, respectively, and like elements are designed with like numerals. Adhesive layer 56 is placed on opaque reflective layer 54 of non-extensible prism array 32 before applying elastomeric film 44. An example of a suitable adhesive for adhesive layer 56 includes an acrylic.

The bond of rigid prisms 34 and opaque reflective layer 54 to adhesive layer 56 is sufficiently strong to allow release film 40 to be removed from window side 36 of non-extensible prism array 32 while facet sides 38 of non-extensible prism array 32 remain bonded to opaque reflective layer 54, adhesive layer 56 and elastomeric layer 44. Therefore, release film 40 maybe removed from non-extensible array 32 by peeling or other suitable method.

EXAMPLE

Retroreflective structure 10 was formed of elastomeric film 12 which was made of polyether urethane having a thickness of 0.01 inches and non-extensible prism array 14 which was made of aliphatic epoxy acrylate, having a thickness of 0.0028 inches. Non-extensible prism array 14 had cube-corner retroreflective elements with each cube-side edge 22 having a length of 0.006 inches and dihedral angles of 90°. Retroreflective structure 10 had a length of 14 inches and a width of 2.5 inches.

Retroreflective structure 10 was measured for retroreflectivity. Retroreflective structure 10 was stretched from 14 inches to 24 inches in length and was maintained at that length under stress for two minutes. The tension was then released, and retroreflective structure 10 was allowed to return to its original shape. The retroreflectivity was again measured. The structure displayed a retroreflectivity of greater than 95% as compared to the structure as measured before stretching, thereby indicating that there was no significant diminution in retroreflectivity.

EQUIVALENTS

Those skilled in the art will recognize, or be able to ascertain using no more than routine experimentation, many equivalents to the specific embodiments of the invention described specifically herein. Such equivalents are intended to be encompassed in the scope of the claims.

I claim:

1. A retroreflective structure having prismatic elements which can be significantly stretched without significantly diminishing the retroreflective properties of the retroreflective structure, comprising:

a) an extensible, elastomeric film; and b) a rigid, non-extensible array of retroreflective prism elements having valleys between said prism elements, wherein said prism elements can split along said valleys when a tensile force is applied to the retroreflective structure, said prism elements are bonded to said elastomeric film, wherein the retroreflective structure can stretch while allowing the prism elements to remain in position with respect to the elastomeric film, thereby allowing the retroreflective structure to be significantly stretched without significantly diminishing the retroreflective properties of the retroreflective structure.

2. The retroreflective structure of claim 1 wherein the elastomeric film is transparent.

3. The retroreflective structure of claim 2 wherein the elastomeric film is formed of material selected from a group consisting of polyurethane, polyisobutylene, polybutadiene, polyvinyl chloride and polyvinylidene chloride.

4. The retroreflective structure of claim 3 wherein the rigid, non-extensible array is formed of material selected from a group consisting of hard epoxy polyacrylates, polyurethane, polynitriles, polycarbonates, polyesters and polyolefins.

5. The retroreflective structure of claim 4 wherein the array is formed of a copolymer.

6. The retroreflective structure of claim 5 wherein a metallized reflective layer is located on the facet sides of said rigid, non-extensible array.

7. The retroreflective structure of claim 6 wherein the metallized reflective layer is formed of a metal selected from the group consisting of aluminum, silver and gold.

8. The retroreflective structure of claim 7 wherein said structure upon removal of a tensile force that stretches the structure more than fifty percent of its prestretched length returns substantially to its prestretched size and shape without significantly diminishing the retroreflective properties of said retroreflective structure.

9. The retroreflective structure of claim 8 which, after having been stretched by a tensile force and then said force is removed, retains about 95 percent or greater retroreflectivity as compared to the retroreflectivity of the prestretched retroreflective structure.

10. The retroreflective structure of claim 1 wherein an adhesive layer is located between said extensible elastomeric film and said rigid, non-extensible array.

11. The retroreflective structure of claim 10 wherein the adhesive layer is formed of an adhesive selected from the group consisting of acrylics, rubber and polyurethane.

12. The retroreflective structure of claim 1 wherein said retroreflective prism elements have a cube-side length in the range of between about 0.004 and 0.02 inches.

13. The retroreflective structure of claim 12 wherein the retroreflective structure after having been stretched by about twenty-five percent in one direction and upon removal of the applied tensile force, the retroreflective structure returns essentially to its original shape.

14. The retroreflective structure of claim 13 which retains about 95 percent or greater retroreflectivity as compared to the retroreflectivity of the prestretched retroreflective structure.

15. The retroreflective structure of claim 1 wherein said retroreflective prism elements include cube-corner prisms.

16. A retroreflective structure, which can be significantly stretched without significantly diminishing the retroreflective properties of the retroreflective structure, comprising:

a) an extensible, elastomeric film;
b) a rigid, non-extensible array of retroreflective prism elements having a facet side and a window side with valleys between said prism elements, wherein said prism elements can split along said valleys when a tensile force is applied to the retroreflective structure, said prism elements are bonded to said elastomeric film, wherein the retroreflective structure can stretch while allowing the prism elements to remain in position with respect to the elastomeric film, thereby allowing the retroreflective structure to be significantly stretched without significantly diminishing the retroreflective properties of the retroreflective structure; and
c) a metallized reflective layer on the facet side of said rigid, non-extensible array.

17. The retroreflective structure of claim 16 wherein the metallized reflective layer is formed of a metal selected from the group consisting of aluminum, silver and gold.

18. The retroreflective structure of claim 16 wherein said retroreflective prism elements include cube-corner prisms.

* * * * *